US 6,608,491 B2

(12) United States Patent
Salmon, Jr.

(10) Patent No.: US 6,608,491 B2
(45) Date of Patent: Aug. 19, 2003

(54) CONTAINER LEVEL MONITORING SYSTEM

(76) Inventor: Robert James Salmon, Jr., 6907 S. NC 41, Wallace, NC (US) 28466

( * ) Notice: Subject to any disclaimer, the term of this patent is extended or adjusted under 35 U.S.C. 154(b) by 0 days.

(21) Appl. No.: 10/092,962

(22) Filed: Mar. 4, 2002

(65) Prior Publication Data
US 2002/0121905 A1 Sep. 5, 2002

Related U.S. Application Data
(60) Provisional application No. 60/272,601, filed on Mar. 2, 2001.

(51) Int. Cl.[7] .......................... G01R 27/26; G01F 23/00
(52) U.S. Cl. ........................ 324/699; 73/304 R; 222/64
(58) Field of Search ................... 200/211, 341, 200/344, 511; 222/58, 64, 61; 324/418, 424, 511, 537, 602, 699; 73/304 R

(56) References Cited
U.S. PATENT DOCUMENTS 4,378,897 A * 4/1983 Kattelmann .................. 222/56
4,574,984 A * 3/1986 Bonerb ......................... 222/61

* cited by examiner

Primary Examiner—N. Le
Assistant Examiner—Vincent Q. Nguyen
(74) Attorney, Agent, or Firm—Mills Law Firm PLLC

(57) ABSTRACT

A monitoring system for the affirmative measurement of feed levels in a bin includes a vertically disposed series of pressure sensors carried on a flexible detector strap releasably mounted at the center of the feed bin. The sensors include radially projecting blades that deflect and actuate in response to the downward flow of material being discharged. The signals from the sensors are routed to a local monitoring site permitting on-site determination of fill level. The signals from plural bins may also be routed to a central monitoring site. The local monitoring site is preferably provided with a programmable logic controller for periodically recording the level of the feed bin. The fill data is remotely retrievable for use in determining resupply needs. The system may also beneficially incorporate a modem communications link with a remote service monitoring site. The service monitoring site periodically retrieves fill data, determines fill level, reorder requirements and timing, and places an order with a designated supplier to ensure resupply in a time frame insuring feed continuity.

10 Claims, 6 Drawing Sheets

CONTAINER LEVEL MONITORING SYSTEM

RELATED APPLICATION

This application claims the benefit under 35 USC 121 of U.S. Provisional Application No. 60/272,601 filed on Mar. 2, 2001 in the name of Robert James Salmon, Jr. and entitled "Container Level Monitoring System".

FIELD OF THE INVENTION

The present invention relates to monitoring systems for inventory levels, and, in particular, a communications based system for monitoring and maintaining inventory levels in agricultural feed bins.

BACKGROUND OF THE INVENTION

Many industries, including the agricultural, concrete, and other bulk material handling operations, require ongoing observation and determination of the contents to provide for continuity of supply through timely reordering to prevent service interruptions. For example, large scale confinement operations for livestock store feed in numerous large feed bins with varying contents proximate the livestock facility. Moreover, a single operation may have multiple facilities, each with multiple bins. In as much as the needs of each facility differ based on species, age and diet regimen, there is little redundancy among the plurality of bins, requiring for monitoring of each to insure efficient continuity of operations. Furthermore, each feedstock may have a designated supplier having varying minimum shipment quantities and delivery schedules. Accordingly, it is imperative that the facility operators make regular determinations of inventory status for each bin on a frequent basis.

At present, even at large facilities such determinations are extremely difficult and generally prone to error. A typical feed bin is a domed cylindrical metal container having a conical top hatch for the delivery of the feed and a conical bottom material discharge chute.

Typically, the hatch provides the sole visual access for determining quantities therein. Accordingly, the facility personnel much scale each bin, and visually or with graduated measuring sticks, measure or estimate the quantity therein, record the relevant information, and upon return to the facility offices make determinations on which bins require resupply from designated suppliers in a time frame that obviates the possibility of a food shortage. Alternatively, the personnel might tap the bin and try to correlate the remaining quantity based on audible response. Both of these manual approaches are prone to estimation errors and missed readings that can lead to feed being ordered prematurely and belatedly. Such ordering mistakes, particularly for large operations, are very costly.

Various container measuring systems have been proposed for agricultural feed containers. None, however, are entirely satisfactory for the varying types of seed material that have to be handled within a facility, and none provide material assistance in maintaining proper levels throughout the facility to avoid shortages, premature purchasing and other costly incidents. For example, U.S. Pat. No. 5,847,567 to Kielb et al. discloses a microwave system for determining the distance between the top level of a liquid or solid in a tank. In addition to being costly, the system relies on a relatively flat surface for accurate measurement, typically not present in bottom discharge feed bins. The system is also highly prone to error at the bottom conical portion, whereat substantial material volume is carried. U.S. Pat. No. 4,065,967 to Beeston discloses a silo level indicating system using temperature sensors to detect the presence of material at varying levels in a bin. The system relies on temperature variations between a reference sensor at the top of the bin and the contained material. At extreme temperatures, hot and cold, the difference may not be sufficient to enable accurate determinations. U.S. Pat. No. 5,002,102 to Hosel discloses a light detector system for determining the fill level of fiber material in a container. The system also relies on a relatively flat upper surface for measuring the fill level, and like the sonic systems is extremely prone to error at the lower levels of the container. U.S. Pat. No. 5,164,555 to Brenton discloses a rotating paddle that is used to sense the level of material in a container to prevent overfill, rather than determine overall volume of the material remaining. U.S. Pat. No. 4,047,434 at Marsh discloses a sensor system mounted on the side walls of a silo that relies on the conductivity of the material for actuating the sensors for determining the fill level. While the silage contains sufficient moisture for establishing the requisite conductivity, the materials typically stored in feed bins are generally poor electrical conductors, thus erroneous readings are encountered.

The above patents are also primarily directed to providing on-site information regarding the fill level by varying visual displays. Thus, while overcoming the need for manual determinations of fill level, the information must be retrieved, dated and reorder procedures conducted elsewhere.

In view of the foregoing, it would be desirable to have an automated system for monitoring the level in each bin, and based on current information determine the reorder mechanism for ensuring timeliness and economy.

BRIEF SUMMARY OF THE INVENTION

The present invention provides an affirmative measurement of feed levels in a bin by a vertically disposed series of pressure sensors carried on a flexible detector strap releasably mounted at the center of the containers. The sensors include radially projecting blades that deflect and actuate in response to the downward flow of material being discharged. The ability of the blades to dynamically rotate in the presence of movement allows for a more uniform detection of feed at the sensed level. The detector strap is easily mounted in conventional feed bins without requiring structural modifications or additions. The signals from the detector strap are routed to a local monitoring site permitting on-site determination of fill level. The signals from plural bins may also be routed to a central monitoring site. The local monitoring site is preferably provided with a programmable logic controller for periodically recording the level of the feed bin. The fill data is remotely retrievable for use in determining resupply needs. The system may also beneficially incorporate a modem communications link with a remote service monitoring site. The service monitoring site periodically retrieves fill data, determines fill level, reorder requirements and timing, and places an order with a designated supplier to ensure resupply in a time frame insuring feed continuity.

Accordingly, it is an object of the present invention to provide a container level detecting system that is easily incorporated into existing containers without structural modification.

Another object is to provide a container level monitoring system that is effective for varying materials contained in agricultural feed bins.

A further object is to provide a container level monitoring system that periodically records fill levels in container for retrieval by an off site service provider that determines procedures for reordering.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENTS

Figure 1:
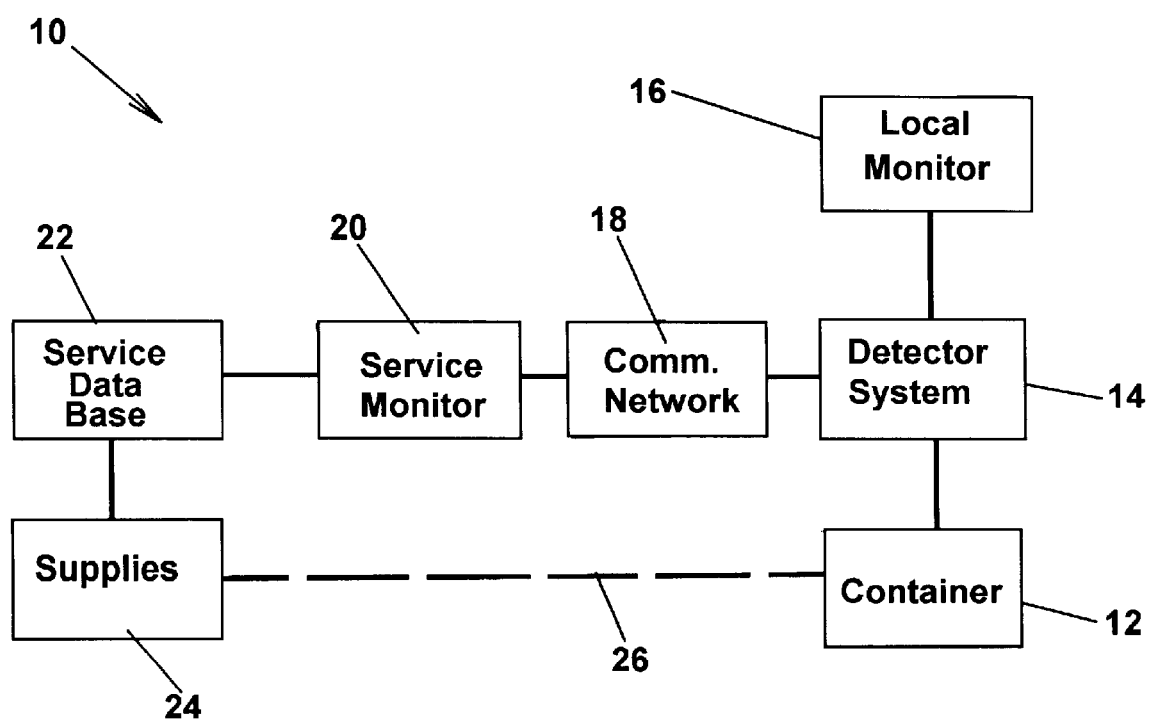
FIG. 1 is a block diagram of a container level monitoring system for the resupply of material to a feed bin.

Referring to the drawings for the purpose of describing the preferred embodiment and not for limiting same, FIG. 1 illustrates container monitoring system 10 for monitoring and maintaining the level of material, such as feed, in a container 12, such as a grain bin, as detected by detector system 14 and routed proximally to a local monitor 16 and routed through communication network 18 to a service monitor 20, which based on determinations at service data base 22 procures supplemental feed on a timely and efficient basis for a supplier 24 for delivery 26 to the container 12 for resupply. The container 12 is a conventional design having a cylindrical midsection, a conical bottom, and a conical or flat top.

Figure 2:
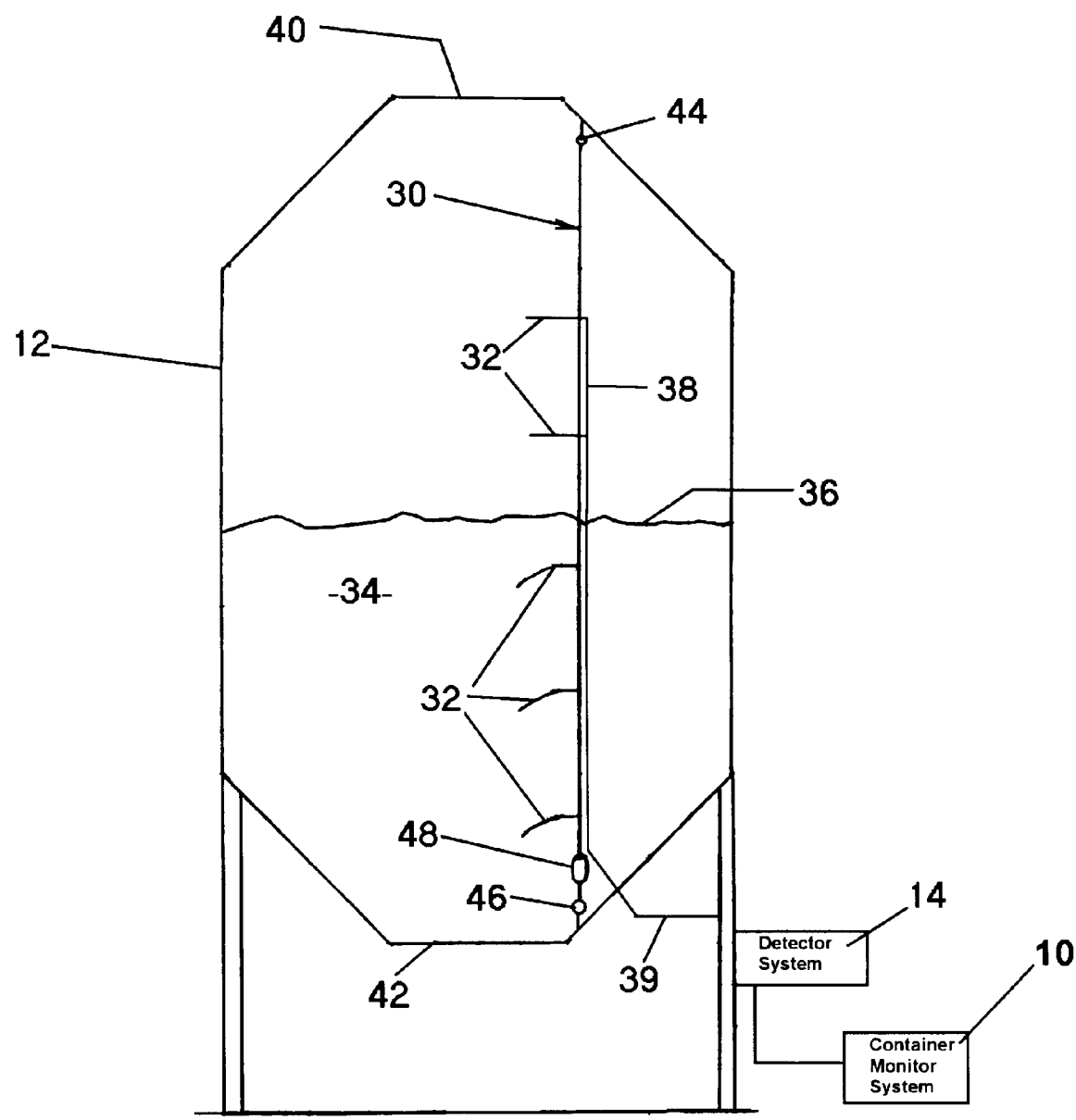
FIG. 2 is a schematic diagram of a local container level monitor coupled with a remote service monitor

Referring to FIG. 2, the detector system 14 for the container 12 comprises a woven belt detector strap 30 mounted vertically within the container 12 carrying a vertical series for flexible actuator switches 32, which selectively actuate in the presence of grain 34 to thereby correlate with the grain level 36 in the container. The switches are interconnected by a cable 38 having an outlet 39 exiting the container and connected with the local monitor 14 enabling local survey of the inventory status an interfacing with the remaining components of the monitoring system 10, as described in greater detail below. The detector strap 30 extends between the upper loading hatch 40 and the discharge chute opening 42, through which the container contents are removed by conventional material handling equipment in a manner well known in the art.

Figure 3:
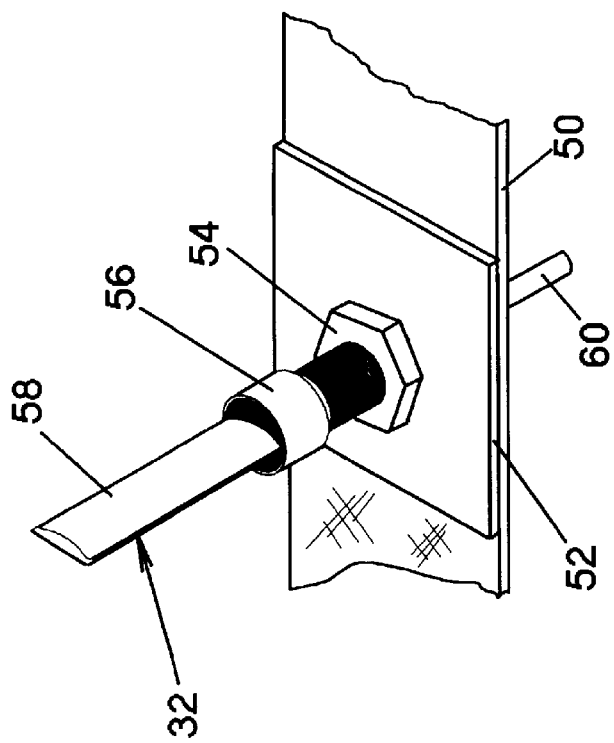
FIG. 3 is a fragmentary perspective view of a detector strap for measuring levels in a feed bin.
Figure 4:
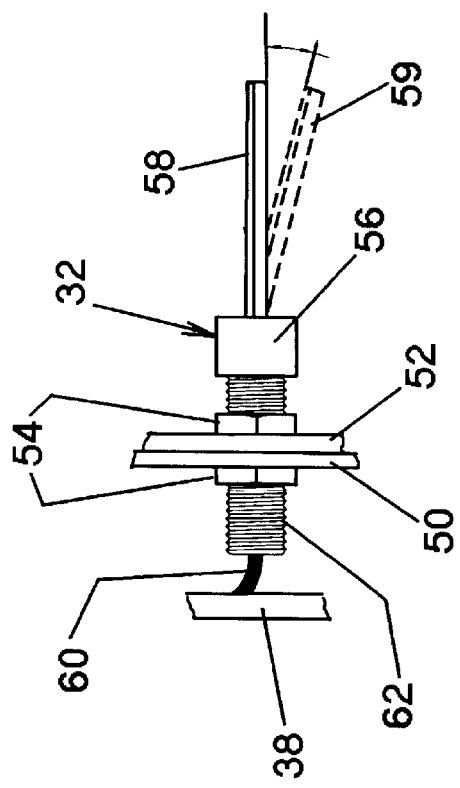
FIG. 4 is a fragmentary side view of the detector strap shown in FIG. 3 illustrating the actuated position in dashed lines.
Figure 5:
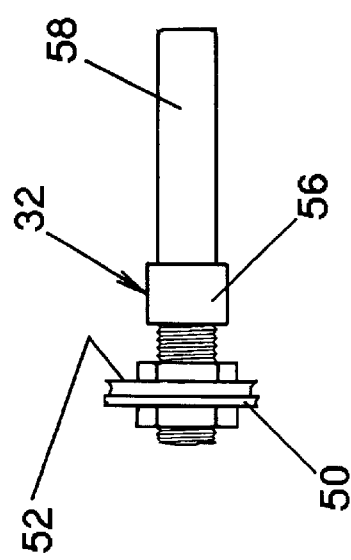
FIG. 5 is a fragmentary top view of the detector strap shown in FIG. 3.

Referring to FIGS. 3 through 5, the detector strap 30 comprises an elongated woven strip 50 having the actuator switches 32 carried on a rectangular adaptor plate 52 attached thereto by suitable fasteners 54. The actuator switch 32 comprises a cylindrical body 56 having a flexible projecting switch blade 58 that deflects as shown in FIG. 4 in the presence of a load to the switched position 59 shown in dashed lines. The switch 32 includes leads 60 projecting rearwardly through threaded shank 62 for connection to the strap cable 38. Upon deflection by the feed in the container, the switch blade 58 reversely conditions the switch contacts to indicate inventory presence at least at the level sensed thereby. A suitable actuator switch for use in the present invention is available a Flex Actuator, Product No. 2580, from Tapeswitch Corporation, Framingdale, N.Y.

The detector strap 30 is connected at the upper end by suitable means, such as a snap hoop, to an upper eye bolt fastener 44 adjacent the hatch 40 and at the lower end by similar means to a lower eye bolt fastener 46 adjacent the chute 42. The strap 30 is longitudinally tensioned by a strap adjuster 48 suitable for use with the strap components. The cable 38 is a six-conductor telephone ribbon cable having one wire as common connected to one side of the switch and the others serially and uniquely connected to the other side of the switch.

Figures 6, 7:
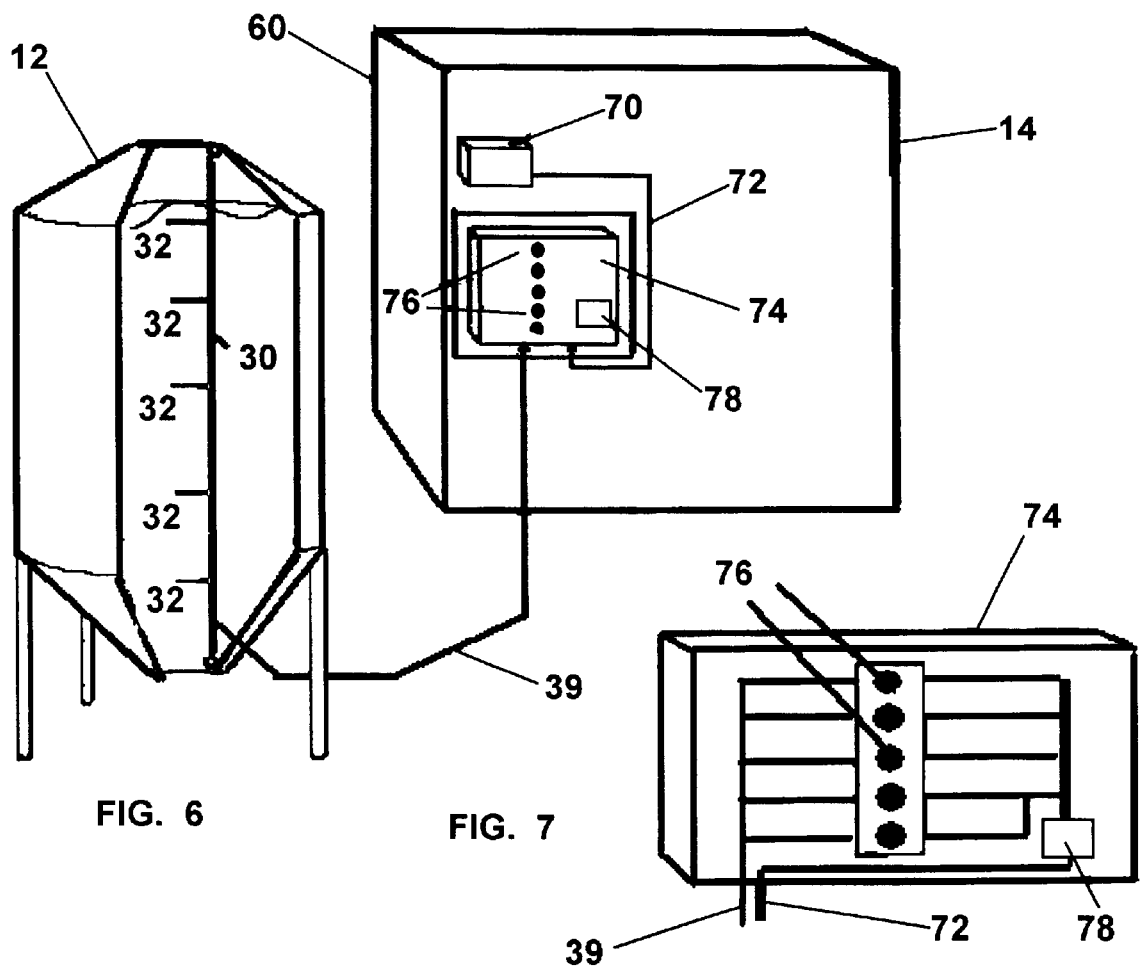
FIG. 6 is a schematic illustration of a container level monitoring system for local on-site monitoring.
FIG. 7 is an illustration of the local level monitor display.

Referring to FIGS. 6 and 7, the outlet 39 from the detector strap 30 is connected to the local monitor 14. The local monitor 14 includes a monitor housing 60 having a AC to DC power supply 70 connected to a utility outlet, not shown, for delivering a 12-volt supply by leads 72 to controller 74 having a vertical series of indicating lights 76 corresponding to the array of switches 32. The common lead from cable 39 is connected to the common of the monitor. The other leads from the cable are respectively connected through normally open master switch 78 to the corresponding lights 76. Accordingly, an operator depressing master switch 78 will effect illumination of all switches 32 actuated in the container 12 thus giving a visual indication of the current level of feed in the container.

Figure 8:
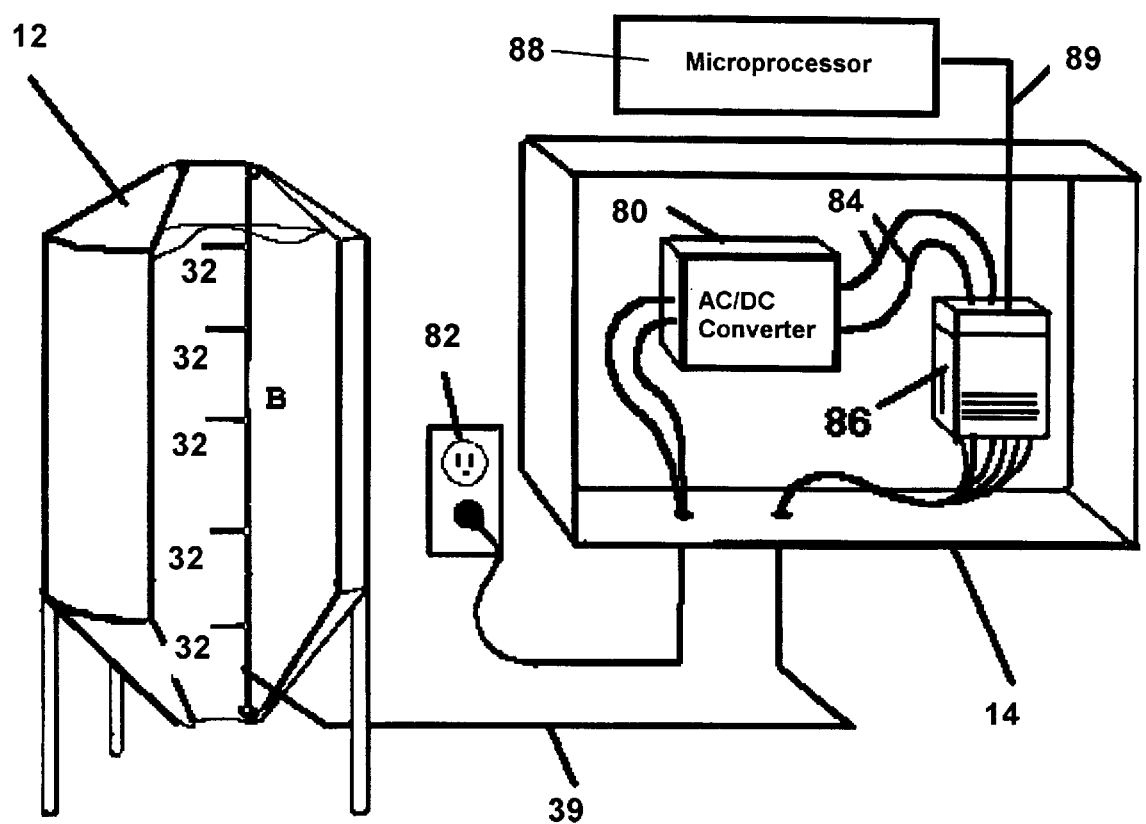
FIG. 8 is a schematic illustration of a container level monitoring system for local on-site and remote monitoring.

Another embodiment is shown in FIG. 8 wherein the local monitor 14 includes a AC/DC converter 80 connected to utility power 82 that supplies 24 volt power on leads 84 to a programmable logic controller 86. A suitable controller for use herein is a Modicon TSX Momentum model programmable logic controller. As in the above embodiment, the common lead from the switches is connected to common on the controller, and the remaining five leads discretely connected to discrete contacts on the controller. The controller periodically polls the state of the switches, date stamps the data, and determines feed level in comparison to a data table referenced for the container specifics and the feed contained therein to establish a feed level, which is then stored in internal memory and accessed for relevant tasks through microprocessor 88 on line 89. Based on retrieved feed level, the operator may place resupply orders for timely and economic delivery. The intermediate levels between actuated switches may interpreted on the basis of historical trend from the time stamped data or through algorithms specific to the container and the contained feed.

Figure 9:
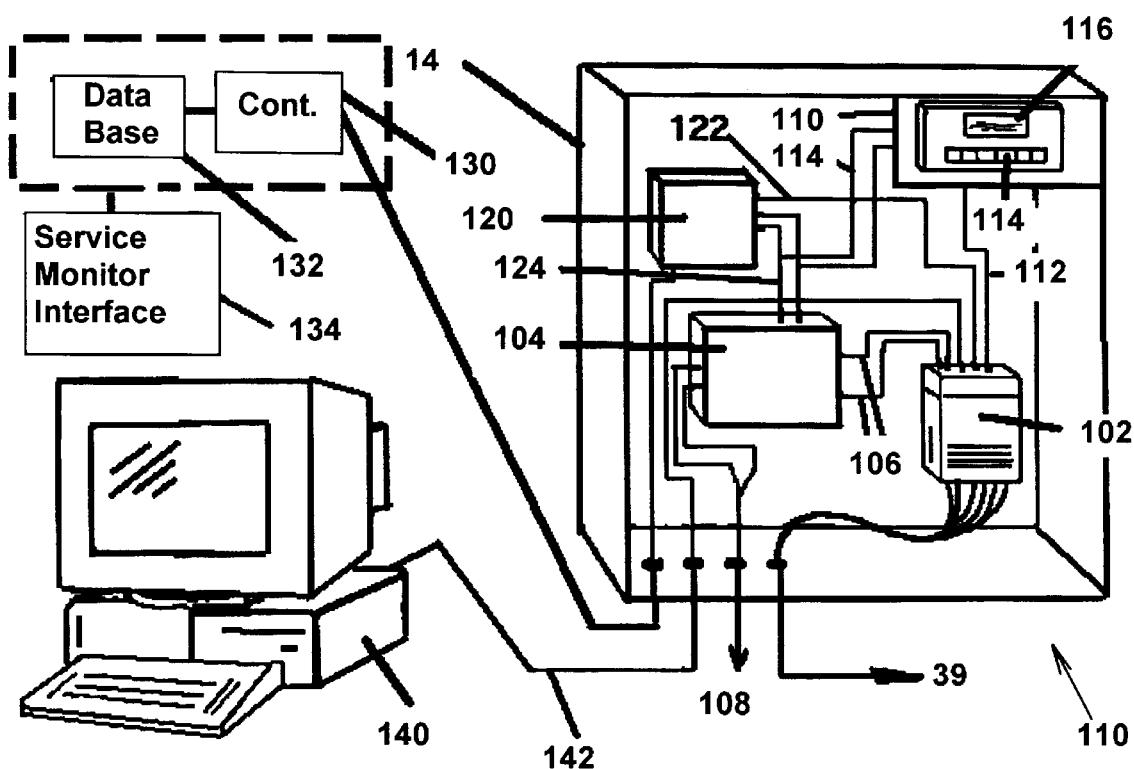
FIG. 9 is a schematic illustration of a container level monitoring system interfaced with a remote service monitoring system.

A further embodiment is shown in FIG. 9 wherein the container level monitoring system 100 provides both local and remote capabilities for maintenance of the levels in the container. Therein, the signals from the cable 39 as received from the detector strap 30 are fed to discrete contact on a programmable logic controller 102 connected to a 24 volt power converter 104 by leads 106. The converter 104 is connected to a utility outlet 108. A programmable display 110 is connected to the controller 102 by a standard serial cable 112 and to the converter 104 by leads 114. A suitable display is available as model KEP MMI-1100-L. By selection of the control buttons 114, a visual indication of the current feed level is the selected container as detected by detector switches 32 is displayed on screen 116. A standard external modem 120 is connected with the controller 102 by serial cable 122 and to the converter by leads 124. A suitable modem is a 3Com 56K external modem. The modem 120 is interfaced by communications cable 126 to a programmable logic controller 130 at the service monitor 20. The controller 130 is compatible with the controller 102 at the local monitor, preferably also a Modicom Momentum programmable logic controller. The service controller 130 through a communications link periodically polls or is addressed by the local controller 110. The feed level data is routed to database 132. The feed level data at the database 132 is connected with service monitor interface 134 accessed by a service provider 22. Communication between with the modem and service supplier may be effects by any appropriate communications format including Website, FTP, direct download or upload, faxing, IVR and the like. Locally, the local controller 104 may be periodically downloaded through a local PC 140 running suitable software such as Modlink from Modicon through serial cable 142. Thereat, the local personnel may through spreadsheet or other custom software applications, use the ongoing data for ongoing decisions.

Based on the data selected by the above configurations, accurate periodic data may be collected to allow the placement of timely reorders of material for the array of containers on the system. Beneficially, the service monitor may undertake the responsibility for effecting the ordering and timing of shipments, using ancillary programs taking into account acceptable suppliers based on prescription or cost determination, feed usage rate, container capacity, minimum shipment requirements, order lead time requirements and like information. As a result the facility operator can establish local and remote monitoring, verification and implementation of actions resulting in timely and cost efficient maintenance of the feeding program, with documentation to permit analysis and refinement thereof.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. In combination with a feed container having a cylindrical middle section, a top provided with a fill opening, and a conical bottom having a discharge opening, a detector system for determining the level of material in the container comprising: an elongated flexible strap member connected at an upper end to said top adjacent said fill opening and at a lower end to said bottom adjacent said discharge opening; a plurality of switch members carried at spaced locations along said strap member, each of said switch members having a projecting blade member deflectable in the presence of material moving toward said discharge opening to move said switch member to switched condition; cable means interconnecting said switch members for obtaining a signal of said switched condition at each switch members; and monitoring means operatively connected with said cable means for displaying said switched conditions to denote said level of material.

2. The detector system as recited in claim 1 including means for tensioning said strap member.

3. The detector system as recited in claim 1 including first controller means operatively associated with said monitoring means for recording said switched conditions at periodic time intervals.

4. The detector system as recited in claim 3 including a microprocessor remote from said monitoring means and operatively connected with said first controller means for accessing said recording of said switched conditions at said periodic time intervals.

5. The detector system as recited in claim 4 including a second controller means operatively connected through a communications link including a modem for accessing said recording of said switched conditions at a remote site.

6. The detector system as recited in claim 5 wherein said communications link is selected from the group comprising a website, faxing apparatus, uploading and downloading.

7. The detector system as recited in claim 6 wherein said switched conditions are transmitted from said second controller means to a database.

8. A monitoring system for determining the level of feed in a feed bin having a top opening and a bottom discharge, said monitoring system comprising: a plurality of pressure sensors carried on an elongated flexible member within said feed bin between said top opening and said bottom discharge, said sensors providing a signal in response to feed in contact therewith; local controller means located proximate said feed bid; cable means operatively connected with said sensors for transmitting said signals to local controller means; a modem operatively connected with said local controller means; a remote controller means located remote from said local controlled means for accessing said signals from said local controller means; a communication means for operatively interconnecting said local controller means with said remote controller means; and processing means operatively associated with said remote controller means for assessing said signals and ordering on the basis of said signals procuring additional feed for delivery to said feed bin.

9. A detector for use in for determining the level of feed in a feed bin containing having an upper fill opening and a lower discharge opening, said detector comprising: an elongated flexible woven strap; a plurality of flexible actuators attached to said strap at longitudinal intervals therealong, said flexible actuators having outwardly projected blades adapted to be flexed under loading conditions indicative of the presence feed thereat to effect a switched condition; and connecting means for attaching a one end of said strap adjacent said fill opening and another end adjacent said discharge opening.

10. The detector as recited in claim 9 wherein said strap includes adjusting means for selectively varying the length of said strap.

* * * * *